United States Patent
Freiberg

(10) Patent No.: US 7,963,417 B2
(45) Date of Patent: Jun. 21, 2011

(54) TANK FILLING REGION OF A MOTOR VEHICLE

(75) Inventor: Stefan Freiberg, Markgröningen (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 301 days.

(21) Appl. No.: 12/329,970

(22) Filed: Dec. 8, 2008

(65) Prior Publication Data

US 2009/0145906 A1    Jun. 11, 2009

(30) Foreign Application Priority Data

Dec. 8, 2007   (DE) .................. 10 2007 059 150

(51) Int. Cl.
*B65D 55/16*    (2006.01)
*B65D 43/02*    (2006.01)

(52) U.S. Cl. ...................... 220/379; 220/86.2

(58) Field of Classification Search ............... 220/86.2, 220/379, 86.1, 375, 744
See application file for complete search history.

(56) References Cited

U.S. PATENT DOCUMENTS

| | | | | |
|---|---|---|---|---|
| 4,653,711 A | * | 3/1987 | Marshell | 248/205.3 |
| 4,746,089 A | * | 5/1988 | Clapper | 248/309.4 |
| 4,776,486 A | * | 10/1988 | Mizusawa | 220/375 |
| 4,898,295 A | * | 2/1990 | Kim | 220/613 |
| 4,957,266 A | * | 9/1990 | Ellis | 248/683 |
| 5,118,019 A | * | 6/1992 | Harrison | 224/563 |
| 5,388,712 A | * | 2/1995 | Brody | 215/229 |
| 5,462,190 A | * | 10/1995 | Lienhart et al. | 220/375 |
| 6,036,061 A | * | 3/2000 | O'Donnell | 222/539 |
| 6,213,331 B1 | | 4/2001 | Morgan et al. | |
| 6,786,239 B1 | | 9/2004 | Welsh | |
| 7,152,546 B2 | | 12/2006 | Bernath | |
| 7,258,245 B2 | * | 8/2007 | Bauer | 220/211 |
| 7,281,640 B2 | * | 10/2007 | Hagano et al. | 220/375 |
| 7,543,715 B2 | * | 6/2009 | Hokazono et al. | 220/303 |
| 2004/0000554 A1 | * | 1/2004 | Griffin et al. | 220/304 |

FOREIGN PATENT DOCUMENTS

| | | |
|---|---|---|
| CH | 694486 A5 | 2/2005 |
| DE | 4027420 A1 | 3/1992 |
| DE | 29921802 U1 | 3/2000 |
| DE | 19921738 A1 | 11/2000 |
| DE | 103 03 863 A1 | 11/2004 |
| JP | 2006182046 A | 7/2006 |

OTHER PUBLICATIONS

German Patent and Trademark Office Search Report, dated Sep. 5, 2008.

* cited by examiner

*Primary Examiner* — Anthony Stashick
*Assistant Examiner* — Niki M Eloshway

(57) ABSTRACT

A tank filling region of a motor vehicle contains at least one tank filler neck, a tank cap for closing the same, and a device for receiving the tank cap in the state in which it is removed from the tank filler neck. The device has a recess formed on a region surrounding the tank filler neck. In this case, it is important that the tank cap has a retaining pin which protrudes from an end side of the latter and with which the tank cap can be plugged into the recess such that it can be fixed to the motor vehicle via the retaining pin, which is plugged into the recess, in its state in which it is removed from the tank filler neck.

8 Claims, 2 Drawing Sheets

TANK FILLING REGION OF A MOTOR VEHICLE

CROSS-REFERENCE TO RELATED APPLICATION

This application claims the priority, under 35 U.S.C. §119, of German application DE 10 2007 059 150.2, filed Dec. 8, 2007; the prior application is herewith incorporated by reference in its entirety.

BACKGROUND OF THE INVENTION

Field of the Invention

The present invention relates to a tank filling region of a motor vehicle having at least one tank filler neck, a tank cap for closing the same, and a device for receiving the tank cap in a state in which it is removed from the tank filler neck. The device has a recess formed on a region surrounding the tank filler neck. The invention also relates to a motor vehicle equipped with a tank filling region of this type.

During refueling of a motor vehicle, the tank cap which closes the tank filler neck has to be removed. In older motor vehicles, a connecting element is customarily not provided between the tank filling region and the tank cap, and therefore, after removal from the tank filler neck, the tank cap has been deposited separately, for example on a vehicle roof or on the fuel pump. It has been known that, when deposited in such a manner, the tank cap has been forgotten and, as a result, the tank filler neck is no longer closed correctly. More recent motor vehicles have a connecting element between the tank cap and tank filling region such that the tank cap can no longer be deposited away from the motor vehicle. In order to be able to fix the tank cap to the motor vehicle in its state in which it is removed from the tank filler neck, different retaining devices are known, but some of these are difficult to handle and, as a result, are only reluctantly accepted by the person refueling the vehicle.

Published, non-prosecuted German patent application DE 103 03 863 A1 discloses a motor vehicle tank filling region of the type in question which has a tank filler neck, a tank cap for closing the same, and a device for receiving the tank cap in the state in which it is removed from the tank filler neck. In this case, the device for receiving the tank cap contains a recess which is formed on the motor vehicle and is matched at least in some sections to the external contour of the tank cap in such a manner that the latter can be at least partially placed into the recess. However, in the case of the known tank filling region, the introduction of the tank cap into the recess on the vehicle is difficult, since the tank cap has to be pushed laterally into the recess. The tank cap has to be touched laterally for this purpose, which may result in contact of the skin with the fuel. However, such direct contact is undesirable in particular for health reasons.

SUMMARY OF THE INVENTION

It is accordingly an object of the invention to provide a tank filling region of a motor vehicle that overcomes the above-mentioned disadvantages of the prior art devices of this general type. in which, in particular, health-endangering contact with fuel can be avoided.

With the foregoing and other objects in view there is provided, in accordance with the invention a tank filling region of a motor vehicle. The tank filling region contains at least one tank filler neck and a tank cap for closing the tank filler neck. The tank cap has a retaining pin. A device is provided for receiving the tank cap in a state in which the tank cap is removed from the tank filler neck. The device has a recess in a region surrounding the tank filler neck. The retaining pin of the tank cap protrudes from an end side of the tank cap and with which the tank cap can be plugged into the recess for fixing the tank cap to the motor vehicle via the retaining pin, which is plugged into the recess, in a state in which the tank cap is removed from the tank filler neck.

The invention is based on the general concept of providing a retaining pin on the end side of a fuel cap, which retaining pin protrudes in the axial direction and with which the tank cap can be plugged into a recess on the motor vehicle, in its state in which it is removed from the tank filler neck, such that, during the refueling of the motor vehicle, the tank cap can be fixed to the motor vehicle in an extremely simple manner. In contrast to the prior art, in this case the tank cap can be held at its handle both during the unscrewing and during the plugging-in movement, in which the retaining pin is plugged into the recess on the motor vehicle, as a result of which direct contact of the skin with the fuel can be prevented. In addition, the securing, i.e. the fixing, of the tank cap to the motor vehicle during the refueling operation can also be considerably simplified, since, in the case of the tank filling region according to the invention, the tank cap which is removed from the tank filler neck merely has to be plugged in the axial direction by its retaining pin into the recess on the motor vehicle and not, as was hitherto customary, in a complex manner by a sideways movement into a recess on the motor vehicle, which recess is matched at least in some sections to the external contour of the tank cap. In this case, the recess for receiving the retaining pin protruding from the end side of the tank cap is arranged on a region directly surrounding the tank filler neck, to be precise, preferably in such a manner that the person carrying out the refueling operation can easily position and therefore fix the tank cap by its retaining pin in the recess on the motor vehicle. Furthermore, the recess on the motor vehicle is preferably arranged in such a manner that a tank flap which closes the tank filling region cannot be closed if the tank cap is located with its retaining pin in the associated recess, as a result of which it can be reliably avoided that the refueling person finishes the refueling operation without fitting the tank cap again correctly on the tank filler neck and therefore closing the tank.

In an advantageous development of the solution according to the invention, the retaining pin tapers conically toward its free end. Such a conical tapering facilitates a positioning of the retaining pin in the recess and therefore of the tank cap on the motor vehicle. In particular, an introducing movement can be simplified by a retaining pin conically tapered in such a manner, as a result of which the ease of operation can be increased.

In a further advantageous embodiment of the solution according to the invention, the recess has a radial groove running substantially vertically downward for the drainage of water. During heavy rain, it is entirely conceivable for water to enter the recess on the vehicle and, during the refueling operation, to pass from there into the tank by accumulating on the retaining pin on the tank cap. The water has to be subsequently separated again in a complex manner in a fuel filter and removed, and therefore contamination of the fuel with water is, if possible, to be avoided right from the beginning. For this reason, the recess has the radial groove which, according to the invention, runs downward and ensures that water which has penetrated the recess can easily drain out of the latter and not pass via the retaining pin into the tank of the motor vehicle. A radial groove of this type is simple to manufacture and therefore cost-effective to produce and is extremely effective for avoiding entry of water into the fuel.

Particularly in winter, the radial groove prevents the conical recess from freezing, in order to ensure storage of the tank cap even in very cold conditions.

In an advantageous development of the solution according to the invention, the recess is arranged in a tank shell surrounding the tank filler neck. Such a tank shell can be produced, for example, as a cost-effective plastic part, in particular by injection molding, as a result of which fine structural details can also easily be produced by an injection molding die of corresponding configuration. Of course, it is also conceivable for such a tank shell to be formed from metal, for example, from shaped sheet metal, as a result of which the recess according to the invention or the associated radial groove can likewise easily be produced by selecting a suitable shaping tool.

Other features which are considered as characteristic for the invention are set forth in the appended claims.

Although the invention is illustrated and described herein as embodied in a tank filling region of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
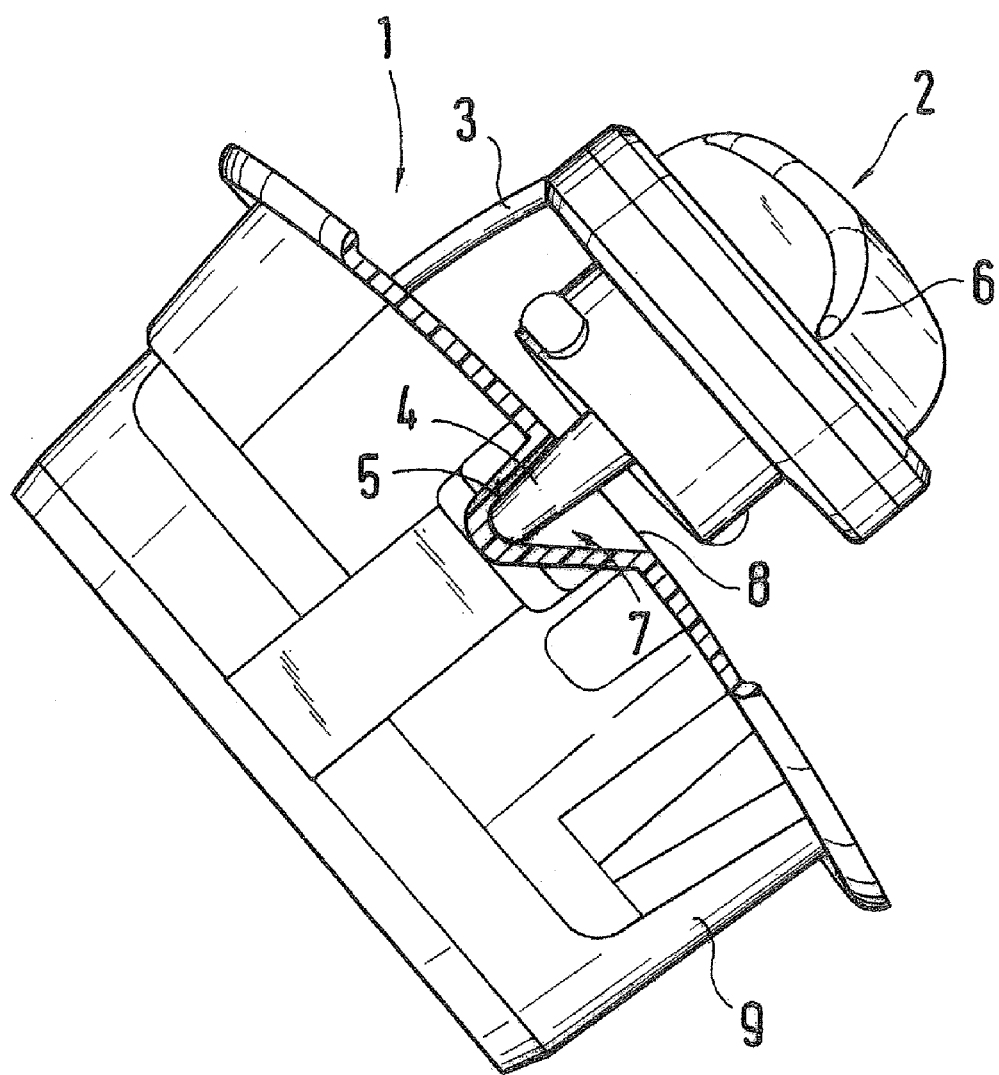
FIG. 1 is a diagrammatic, part sectional view of a tank filling region according to the invention.

Referring now to the figures of the drawing in detail and first, particularly, to FIG. 1 thereof, there is shown a tank filling region 1 according to the invention of a motor vehicle (otherwise not illustrated) which has a tank filler neck and a tank cap 2 for closing the same. In this case, the tank cap 2 is connected captively via a connecting element 3 to the tank filling region 1 arranged on the motor vehicle. During refueling of the motor vehicle, the tank cap 2 is removed, for example unscrewed, from the tank filler neck and is fixed adjacent to the tank filling neck to the tank filling region 1. Fixing takes place here by plugging in a retaining pin 4 which is arranged on an end side of the tank cap 2 and protrudes in the axial direction from the latter and can be plugged into an associated recess 5 arranged on the tank filling region 1. By plugging the retaining pin 4 on the tank cap 2 into the recess 5 on the tank filling region 1, the tank cap 2 can be reliably fixed to the motor vehicle in its state in which it is removed from the tank filler neck.

Figure 2:
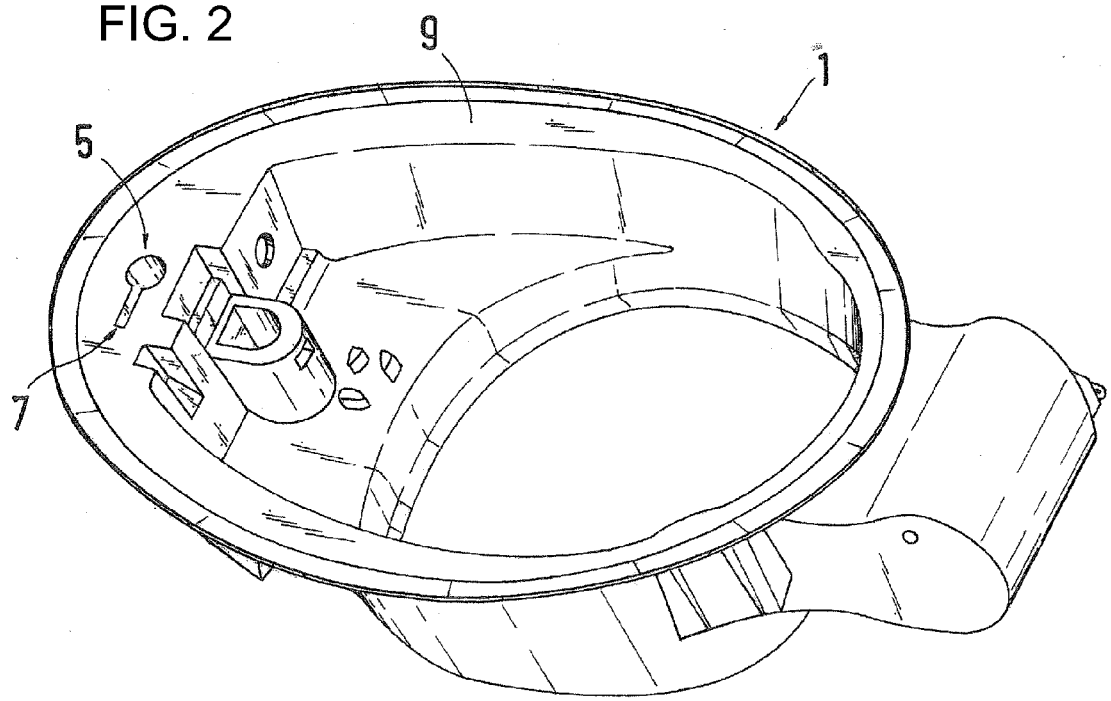
FIG. 2 is a diagrammatic, perspective view of the tank filling region, but without the tank cap.
Figure 3:
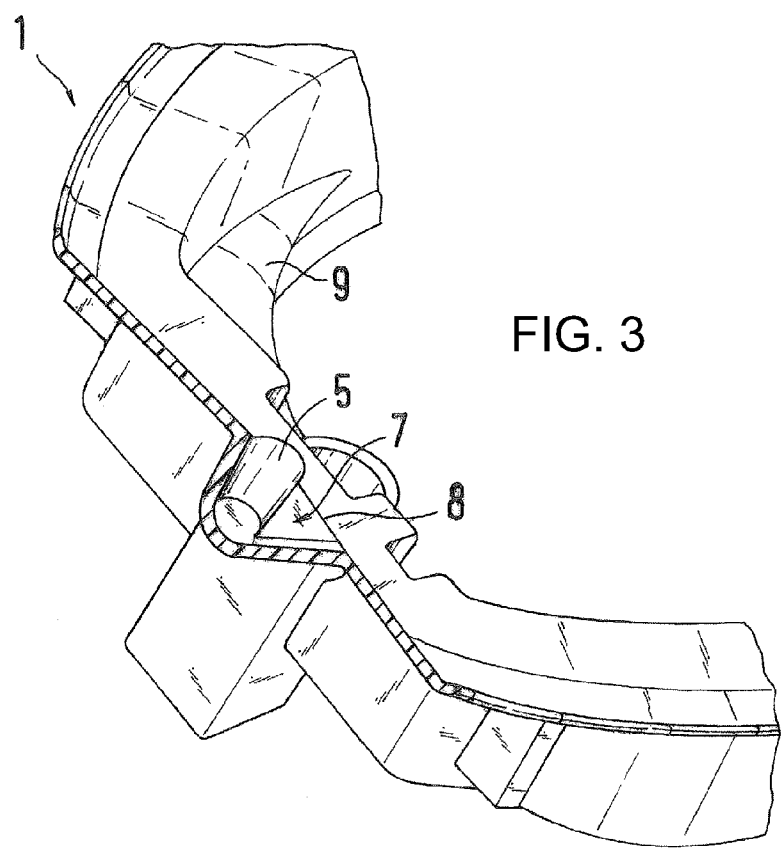
FIG. 3 is a diagrammatic, part sectional view in a region of a recess of the tank filling region.

As can be gathered from FIGS. 1 to 3, the recess 5 here is arranged adjacent to the tank filler neck, in particular is positioned at the side thereof.

In order to facilitate the introduction of the retaining pin 4 into the recess 5, it can be provided that the retaining pin 4 tapers conically toward its free end, as is shown, for example, in FIG. 1. Accordingly, of course, the recess 5 can also have an internal contour which is complementary with respect to the conically configured retaining pin 4, as is illustrated, for example, in the partially sectioned views of FIGS. 1 and 3. The conical configuration of the recess 5 and of the associated retaining pin 4 make it easier in particular to plug the retaining pin 4 into the recess 5 and therefore to fix the tank cap 2 to the motor vehicle, as is required in particular during refueling of the same. By use of the retaining pin 4 which protrudes in the axial direction from the end side of the tank cap 2, the tank cap 2 can be fixed to the tank filling region 1 by an axial plugging-in movement and does not have to be introduced, as known, for example, from the prior art, by a complex and complicated sideways movement into a recess on the motor vehicle, the internal contour of which recess substantially corresponds to the external contour of the tank cap 2 and, as a result, fixes the latter.

By the retaining pin 4, it is also possible for a person holding the tank cap 2 to handle the tank cap 2 exclusively at its handle 6 both when opening the tank and when fixing the tank cap 2 to the motor vehicle and when closing the tank and, as a result, to avoid direct contact with fuel. The handle 6 of the tank cap 2 is configured in a haptically favorable manner such that opening and closing of the tank, for example by turning the tank cap 2, is easily possible.

In order to be able to further simplify the fixing of the tank cap 2 to the motor vehicle, it can be provided that the retaining pin 4 is aligned coaxially with respect to the tank cap 2, i.e. is arranged centrally thereon.

If FIGS. 1 and 3 are considered, it is noticeable that the recess 5 has a radial groove 7 running substantially vertically downward for the drainage of water. The radial groove 7 causes water which has inadvertently penetrated the recess 5 to flow away such that the water cannot pass into the tank via the retaining pin 4 of the tank cap 2 and thereby contaminate the fuel. By the embodiment of the radial groove 7 that is illustrated according to FIGS. 1 and 3, it can also be ensured that there is an inclination of the recess 5 via the radial groove 7 as far as a free edge 8 of the radial groove 7 such that water can drain off solely on account of gravitational force.

The recess 5 which receives the retaining pin 4 of the tank cap 2 can generally be arranged in a tank shell 9 which surrounds the tank filler neck and is produced, for example, from plastic and in particular by injection molding. Of course, a metallic formation of the tank shell 9 is also conceivable, the tank shell then being configured, for example, as a shaped sheet-metal part.

In order to be able to keep the costs for producing a tank cap 2 according to the invention with the retaining pin 4 arranged on the end side thereof as low as possible, the retaining pin 4, like at least part of the tank cap 2, is preferably formed from plastic and, together with the part of the tank cap 2 which is formed from plastic, is produced by injection molding in one working step. Of course, in addition to being formed from plastic, the retaining pin 4 can also be formed from metal, with the retaining pin 4 being fastened in this case to the tank cap 2 in a correspondingly suitable manner. Furthermore, it is conceivable, in the case of a retaining pin 4 formed from metal and a tank shell 9 likewise formed from metal, that at least some regions of the retaining pin 4 and/or of the tank shell 9 are of magnetic construction and, as a result, assist in fixing the tank cap 2 to the tank filling region 1, in particular in fixing the retaining pin 4 in the recess 5.

In general, the recess 5 on the tank filling region 1 is preferably arranged in such a manner that the tank cap 2 plugged with its retaining pin 4 in the recess 5 prevents closing of an outer tank flap, and therefore, after the end of the refueling operation, a person refueling the motor vehicle is forcibly reminded to screw the tank cap 2 onto the tank filler neck in order to be able to close the outer tank flap.

However, a particular advantage of the tank filling region 1 according to the invention is that, in comparison to the prior art, fixing of the tank cap 2 to the tank filling region 1 is significantly more easily possible and in particular direct contact with the fuel and the resultant health risks can be reliably avoided.

The invention claimed is:

1. A tank filling region of a motor vehicle, comprising:
at least one tank filler neck;
a tank cap for closing said tank filler neck, said tank cap having a retaining pin;
means for receiving said tank cap in a state in which said tank cap is removed from said tank filler neck, said means having a recess formed therein in a region surrounding said tank filler neck, said recess disposed laterally next to said tank filler neck;
said retaining pin of said tank cap protruding from an end side of said tank cap and with which said tank cap can be plugged into said recess in an axial direction for fixing said tank cap to the motor vehicle via said retaining pin, which is plugged into said recess, in a state in which said tank cap is removed from said tank filler neck, said retaining pin having a free end and tapering conically towards said free end thus defining a conically designed retaining pin; and
said recess having an internal contour being complementary to said conically designed retaining pin.

2. The tank filling region according to claim 1, wherein said retaining pin is aligned coaxially with respect to said tank cap.

3. The tank filling region according to claim 1, wherein said recess has a radial groove running substantially vertically downward for drainage of water.

4. The tank filling region according to claim 3, wherein said recess has a base and said radial groove tapers toward said base of said recess.

5. The tank filling region according to claim 1, further comprising a tank shell surrounding said tank filler neck, said recess is formed in said tank shell.

6. The tank filling region according to claim 1, wherein said retaining pin is formed from plastic and is produced in particular together with at least part of said tank cap by injection molding.

7. The tank filling region according to claim 1, wherein said retaining pin is disposed centrally with respect to said tank cap.

8. A motor vehicle, comprising:
a tank filling region, including:
at least one tank filler neck;
a tank cap for closing said tank filler neck, said tank cap having a retaining pin;
means for receiving said tank cap in a state in which said tank cap is removed from said tank filler neck, said means having a recess formed therein in a region surrounding said tank filler neck, said recess disposed laterally next to said tank filler neck;
said retaining pin of said tank cap protruding from an end side of said tank cap and with which said tank cap can be plugged into said recess in an axial direction for fixing said tank cap to the motor vehicle via said retaining pin, which is plugged into said recess, in a state in which said tank cap is removed from said tank filler neck, said retaining pin having a free end and tapering conically towards said free end thus defining a conically designed retaining pin; and
said recess having an internal contour being complementary to said conically designed retaining pin.

* * * * *